Oct. 13, 1953  S. L. MOBLEY  2,655,123
SIGNALING DEVICE FOR MOTOR VEHICLES
Filed June 23, 1951  2 Sheets-Sheet 1

Inventor
SHELTON L. MOBLEY
By

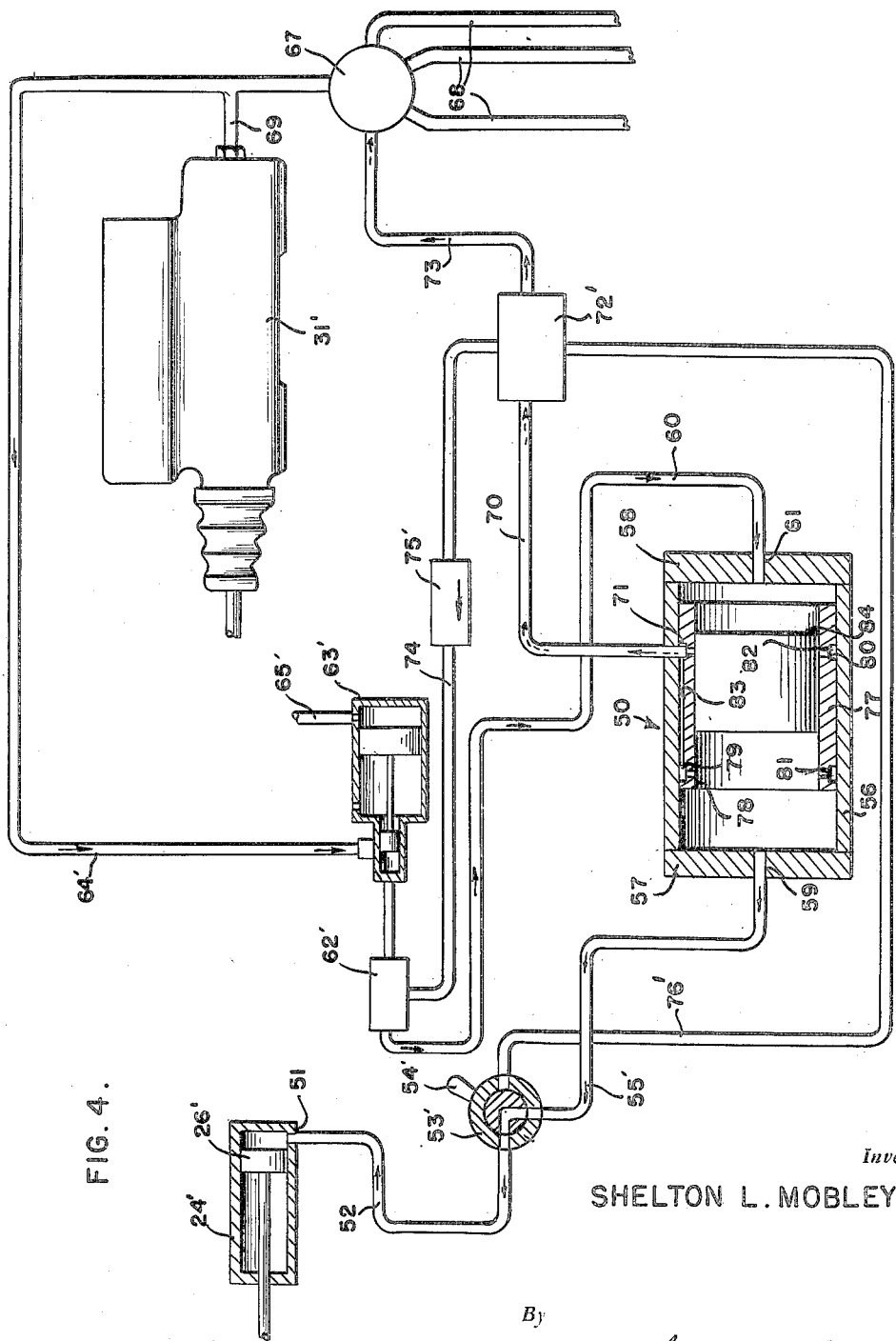

Patented Oct. 13, 1953

2,655,123

UNITED STATES PATENT OFFICE 2,655,123

SIGNALING DEVICE FOR MOTOR VEHICLES

Shelton Lee Mobley, Waycross, Ga.

Application June 23, 1951, Serial No. 233,150

4 Claims. (Cl. 116—39)

The present invention relates to a signal assembly, and more particularly has reference to a signalling device for motor vehicles and the like which is adapted to indicate when the vehicle brakes are applied that the vehicle is stopping.

In recent years, the majority of States have enacted rather stringent traffic regulations concerning the passing of school buses when the buses have stopped to either receive or discharge school children. While numerous signalling devices have been employed to indicate to the drivers of other vehicles that the bus has stopped, these prior signalling devices are not too satisfactory, in that the driver must manually operate the signal. This means that the driver is not able to devote his full attention to the driving of the bus which, of course, is undesirable, but, in addition, the manually operated signals require a somewhat strenuous effort on the part of the driver for their operation. Inasmuch as the bus makes a considerable number of stops in the course of a day's travel, it can be seen that the driver is subjected to considerable extra work. Accordingly, an important object of my invention is to provide a signalling device for vehicles of the character described which will overcome the above and other objectionable characteristics.

Viewing the invention broadly, it comprises pivotally mounting a signal arm at a strategic location on the vehicle, securing the arm to the piston rod of a hydraulic cylinder, operatively connecting the cylinder with the hydraulic braking system of the vehicle, and subjecting the arm to spring action to normally hold the arm in the inoperative position. Upon the application of the brakes, a fluid is admitted into the cylinder to force the piston longitudinally of the cylinder and thereby move the arm against the action of the spring means to an operating or visible position, thus indicating to the drivers of other vehicles that the bus has stopped. Upon release of the brakes, the spring means will move the piston rod in the opposite direction and, of course, return the arm to its inoperative position.

A further object of my invention is to provide a signalling device of the character described which includes but few cardinal working parts which can be employed with motor vehicles of all types with little, if any, modification of the vehicle, and which is positive and efficient in operation.

Yet another object of my device is to provide a signalling device finding especial use on motor vehicles which may be readily installed in the vehicle without the employement of highly skilled labor and which presents few problems from the maintenance or repair point of view.

And still a further object of my invention is to provide a signalling unit which is actuated by the hydraulic braking system of a motor vehicle wherein means are provided to prevent the loss of brake fluid in the event the signalling unit is broken or otherwise damaged.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 3:
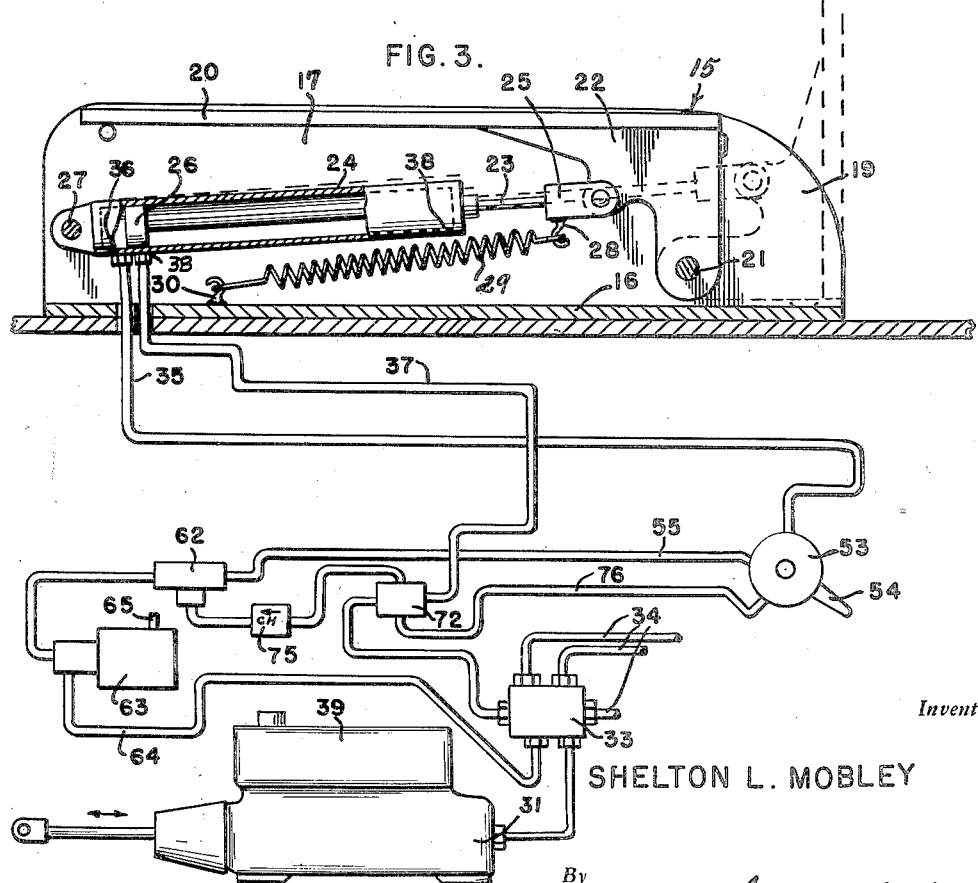

Figure 3 is a plan view, partly broken away and partly in section, of the signalling device and illustrating those portions of the hydraulic braking system necessary to fully understand the construction and operation of the signalling device, and Figure 4 is a diagrammatic representation of a modified form of signalling device embodying means to prevent the loss of brake fluid in the event the signal arm is broken or otherwise damaged.

Figure 2:
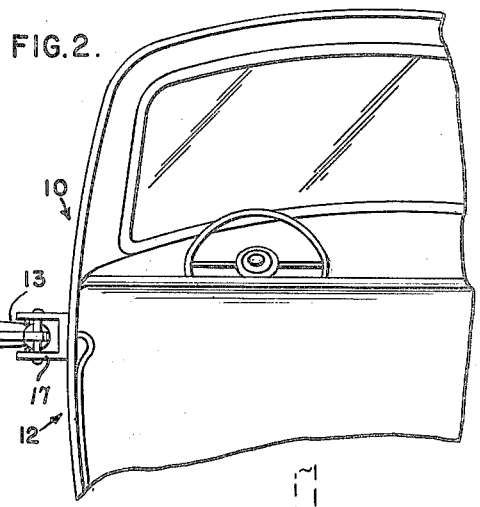
Figure 2 is a vertical sectional view taken through a fragment of a motor vehicle showing the location of the signalling device.

Referring to Figure 2, I have indicated a conventional motor bus 10 and my novel signalling device, indicated generally 12, is adapted to be located on the left hand side of the bus adjacent the driver's seat. Of course it is to be understood that the device may be located at other places on the bus. The signal device 12 comprises a bracket 15 including a base 16 and parallel side walls 17, and the front and rear edges of the side walls are preferably rounded, as illustrated at 19. The base 16 is adapted to be secured to the side wall of the bus in any suitable or convenient manner such as by bolts or the like.

A signal arm 20, which may be of any desired configuration, and which may have stencilled or painted thereon any desirable indicia, is pivotally connected adjacent its free end to a rod or the like 21, the ends of the rod being suitably journalled in the side walls 17. The rod is formed with an inwardly extending extention or gooseneck 22 at the front end and the gooseneck is attached to a piston rod 23 of a hydraulic cylinder 24 by any suitable type connector 25. The opposite end of the rod 23 carries a piston 26, and the cylinder casing is pivotally connected to the side walls 17 as shown at 27, the pivotal connection being located near the rear end of the bracket 15. A hook 28 is carried by the extension 22 and one end of a helical spring 29 is connected to the hook, while the opposite end is attached to a second hook 30 fixed to the base 16 of the bracket 15. As will later be described, the spring 29 will return the arm 20 to its nested or inoperative position when pressure upon the brake pedal is relieved.

To more clearly understand the operation of the system, the following cycle is accomplished. When pressure is applied to the brake pedal, hydraulic fluid in master cylinder 31 flows through a line 64 into a hydraulic outlet 33 preferably secured to the master cylinder, and thence to a reduced cylinder which is connected to a hydrovac unit 63, the hydrovac unit 63 in turn communicating with the vacuum motor (not shown) through conduit 65. The fluid travels from the neck to a T-fitting 62, from which it moves through a line 55 to a cut-off valve 53 having a lever 54 permitting its manual control. The fluid then travels through a conduit 35 and into the lower end of the cylinder through a port 36 which, of course, will move the rod 23 longitudinally, whereupon the arm 20 is moved outwardly about its pivot against the action of the spring 29. This, of course, will indicate to drivers of other vehicles that the bus has stopped.

As the piston crosses outlet hole 38 in the cylinder, fluid may pass through line 37 to a junction box 72, from which the fluid moves to the hydraulic outlet 33. The outlet 33 is provided with lines 34 which lead to the brake cylinders.

The fluid returns to the master cylinder 31 in two different ways. Upon release of pressure upon the brake pedal, the spring 29 will move the rod 23 inwardly, whereupon the fluid will flow in a reverse direction through conduit 35, valve 53, line 55, T-fitting 62 and line 64 back to the cylinder 31. The fluid also returns from the brake cylinder to the outlet 33, junction box 72, check valve 75, T-fitting 62, thence to hydrovac unit 63 and through the line 64 to the cylinder 31. It will further be noted that a line 76 leads from the junction box 72 to the cut-off valve 53. This line is used only when the operating arm 20 is not in use which, of course, can be accomplished by the proper manipulation of the lever 54 of the cut-off valve 53.

Figure 1:
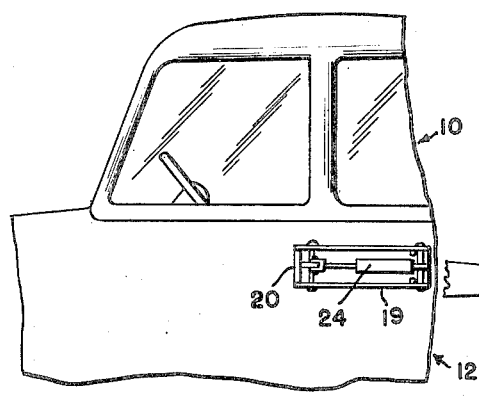
Figure 1 is a fragmental view in side elevation, showing the location of the signalling unit with respect to the driver's seat of a motor vehicle, such as a bus.

With reference to Figure 4 wherein I have diagrammatically illustrated a signalling system wherein a pressure valve, denoted generally 50, is employed to positively prevent the loss of the brake fluid in the event the signal arm operated by the piston and cylinder arrangement 24 and 26 is torn off or damaged in any other way. Inasmuch as the cylinder for operating the signal is substantially the same as that illustrated in Figures 1 to 3, the same reference characters will be applied, with the exception that they are primed. The cylinder 24' instead of having a pair of openings 36 and 38 employs but a single opening 51 with which one end of a conduit 52 communicates. The forward end of the cylinder may be provided with a stop (not shown) for the piston 26' and, of course, when fluid is admitted through the opening 51, the piston is moved toward the left to move the signal arm outwardly and upwardly and, of course, the piston is returned by means of the spring associated with the signal arm and the bracket supporting the cylinder and signal arm.

Conduit 52 leads to a three-way cut-off valve 53' which is manually controlled by means of a lever 54'. Conduit 55' extends from the valve 53' to the front or forward end of the pressure valve 50. The pressure valve 50 comprises a cylinder 56 having removable front and rear ends 57 and 58, respectively, and the detachable connection between the ends and the cylinder may be of any suitable type. The conduit 55' is fitted within an orifice 59 in the front end of the cylinder. A conduit 60 is fitted into opening 61 in the rear end 58, and the conduit 60 leads to a T-fitting 62' which, in turn, is connected to a reduced neck portion of a hydrovac 63'. The hydrovac communicates with master cylinder 31' through line 64' and to the vacuum motor through line 65'. A hydraulic outlet is connected to the cylinder 31' as at 69 and has lines 68 leading to the individual brakes, and the line 64' communicates with the cylinder 31' through the outlet 67.

Conduit 70 is tapped into an opening 71 in the cylinder 56 in proximity to the rear end 58, and this line leads to a junction block 72', and tube 73 connects the junction block with the outlet 67. A conduit 74 extends from the T-fitting 62' to the block 72', and a check valve 75' may be interposed in this line. A further conduit 76 leads from the cut-off valve 53 to the junction block 72.

Perhaps the salient feature of this particular signalling system resides in the pressure valve 50, and it will be noted that a sleeve 77 having open ends 78 is mounted within the cylinder 56. Annular grooves 79 and 80 extend around the sleeve 77 adjacent the open ends thereof, and the grooves are provided with a series of ports 81 and 82, respectively, which lead into the interior of the sleeve 77. A groove 83 along the upper face of the sleeve 77 intersects with the grooves 79 and 80, the purpose of which will later be more fully described. A floating piston 84 is reciprocable longitudinally within the sleeve 77, the position of which is determined by the stroke of the operating cylinder.

In operation, when pressure is applied to the brake, the fluid in the master cylinder 31' will be admitted into the reduced neck portion of the hydrovac unit 63', thus causing the fluid to be forced into the T-fitting 62'. Fluid then travels through the line 60 into the pressure valve 50, thus moving the piston 84 so that fluid will flow through the ports 81 in the groove 79 by reason of the intersecting groove 83 and thus pass through the cut-off valve 53' into the cylinder 24' to cause the piston 26' to operate the signal arm.

At the same time, fluid will also pass out through the line 70 into the junction block 72', from which it travels to the block 67 for distribution through the line 68 to the individual brakes. Upon release of pressure on the brake pedal, fluid will return through block 67 to the junction block 72', conduit 74, check valve 75', T-fitting 62', hydrovac unit 63' and then through the master cylinder 31'. The fluid will also return from the cylinder 24' through the cut-off valve 53', pressure valve 50, line 60, T-fitting 62', hydrovac unit 63' and into the cylinder 31'.

Should the cylinder 24' not be in operation by virtue of the positioning of the lever 54' on the valve 53', it will be noted that conduit 76' leads from the cut-off valve 53' to the junction block 72' to provide the proper fluid circuit.

The efficacy of this system is thought to be readily apparent. In the event the signal arm is torn off, thereby rupturing the tube thereto, the fluid to the operating cylinder would be lost, but the brakes would continue to operate. In case such an accident occurred, the piston 84 would automatically move under the ports in the groove 80, thus sealing the fluid therein and back to the brakes, thus enabling the brakes to remain operative. The piston, of course, will remain in this position until the repairs are made and the lines bled.

The invention is not to be confined to any strict conformity with the showing in the drawings, but may be changed or modified so long as such changes or modifications mark no material departure from the salient features of the invention, as expressed in the appended claims.

I claim:

1. In a signalling apparatus for use with motor vehicles having a hydraulic brake system, a brake pedal a signalling arm pivotally mounted on the vehicle for movement in a horizontal plane, a cylinder, a piston movable in the cylinder, a rigid direct connection between the piston and the signalling arm, a master cylinder, a conduit leading to the master cylinder and in communication with a port in said cylinder on the pressure end of tha cylinder, a second conduit leading to the master cylinder and in communication with a port in the cylinder closely adjacent the first named port whereby the application of pressure to the brake pedal admits fluid into the first mentioned cylinder to move the piston and the rigid connection between the piston and the signalling arm to move the said arm about its pivot, and spring means operatively connected with the signalling arm to move the said arm in an opposite direction about its pivot when pressure to the brake pedal is relieved.

2. A signalling apparatus as claimed in claim 1 wherein the cylinder is pivotally mounted.

3. In a signalling apparatus for use with motor vehicles having a hydraulic brake system, a brake pedal a horizontally disposed base member mounted within a well in the vehicle, a pair of parallel side members extending upwardly from the base member, an arm pivotally mounted between said parallel side members and movable through an opening in the vehicle, a cylinder pivotally mounted between said parallel side members in spaced relation to said arm, a piston movable in the cylinder, a piston rod secured to the piston and directly connected to the signalling arm, a master cylinder, a line leading from the master cylinder to the pressure end of the cylinder, a second line leading from the opposite end of the cylinder to the master cylinder whereby the application of pressure to the brake admits fluid into the pressure end of the cylinder to move the piston and piston rod, thus moving the signalling arm about its pivot outwardly through the opening in the vehicle, and spring means operatively connected to the signalling arm and to the base member to move the signalling arm about its pivot in an opposite direction when pressure on the brake pedal is relieved.

4. A signalling apparatus for use with motor vehicles having a hydraulic braking system comprising a pivotally mounted arm, a cylinder, a connection between the piston movable in the cylinder and the signalling arm to move the arm about its pivot, a master cylinder, conduits connecting the master cylinder with the cylinder, additional conduits connecting the master cylinder with the individual brakes, a third cylinder interposed in the conduits between the first named cylinder and the conduits leading to the individual brakes, a piston floatingly mounted within the third cylinder, and means within said third cylinder cooperating with the floating piston to close the conduits leading to the individual brakes if the conduits leading to the first named cylinder are broken.

SHELTON LEE MOBLEY.

References Cited in the file of this patent

UNITED STATES PATENTS

| Number | Name | Date |
|---|---|---|
| 1,395,088 | Brown | Oct. 25, 1921 |
| 1,440,393 | Kennedy | Jan. 2, 1923 |
| 1,823,985 | Pollock | Sept. 22, 1931 |
| 1,827,289 | Haywood | Oct. 13, 1931 |
| 2,006,654 | Roan | July 2, 1935 |
| 2,036,956 | Pohl | Apr. 7, 1936 |
| 2,134,299 | Cosner | Oct. 25, 1938 |
| 2,147,010 | Cranford | Feb. 14, 1939 |
| 2,252,529 | Simpkins | Aug. 12, 1941 |
| 2,276,441 | Warlick | Mar. 17, 1942 |